United States Patent [19]

Mastman

[11] 4,330,072
[45] May 18, 1982

[54] DISPENSER WITH SIDE SPOUT FOR FLOWABLE MATERIAL

[75] Inventor: Gary J. Mastman, Saratoga, Calif.

[73] Assignee: National Dispenser Company, Santa Barbara, Calif.

[21] Appl. No.: 123,619

[22] Filed: Feb. 22, 1980

Related U.S. Application Data

[63] Continuation-in-part of Ser. No. 928,581, Jul. 27, 1978, abandoned, which is a continuation-in-part of Ser. No. 852,139, Nov. 16, 1977, Pat. No. 4,146,154, said Ser. No. 852,139, is a continuation of Ser. No. 683,628, May 5, 1976, abandoned.

[51] Int. Cl.³ .............................................. B05B 11/04
[52] U.S. Cl. .................................................... 222/209
[58] Field of Search ............... 222/209, 211, 543, 481, 222/464, 215, 212, 572

[56] References Cited

U.S. PATENT DOCUMENTS

| | | | |
|---|---|---|---|
| 2,223,256 | 11/1940 | Kross | 222/211 X |
| 2,854,175 | 9/1958 | Spitzmesser | 222/209 |
| 3,192,555 | 7/1965 | Nyden | 222/543 X |
| 3,331,537 | 7/1967 | Benedict | 222/211 |
| 3,465,921 | 9/1969 | Mullan | 222/212 |
| 3,474,936 | 10/1969 | McDonnell | 222/211 |
| 3,618,829 | 11/1971 | Elmore et al. | 222/209 |
| 4,087,024 | 5/1978 | Martin et al. | 222/211 |

FOREIGN PATENT DOCUMENTS

| | | | |
|---|---|---|---|
| 961015 | 1/1975 | Canada | 222/211 |
| 305075 | 4/1955 | Switzerland | 222/209 |

Primary Examiner—Stanley H. Tollberg
Attorney, Agent, or Firm—John L. McGannon

[57] ABSTRACT

A dispenser for flowable material, such as liquids or powder, having a container provided with a corrugated sidewall which allows the container to collapse when a downward force is exerted on the upper part thereof. The container has a tubular extension or spout projecting laterally from the upper part thereof and an upper surface free of structure to allow the palm or other part of the hand to readily engage the upper surface and to exert a downward force thereon. The force on the container causes material therein to travel upwardly through an inner tube and laterally through the spout to an outlet at the outer end of the spout. In one embodiment of the dispenser, the upper part of the container has a top opening therethrough to allow filling of the container and a cap removably closes the opening, the cap having a flat or slightly curved upper surface and being press-fitted or threaded onto the upper part to close the opening. In another embodiment, the container has a threaded neck, and a top with the spout thereon is threaded onto the neck. The spout is integral with the upper wall of the top and extends laterally therefrom. Several other embodiments of the dispenser are disclosed.

30 Claims, 13 Drawing Figures

U.S. Patent   May 18, 1982   Sheet 1 of 3   4,330,072
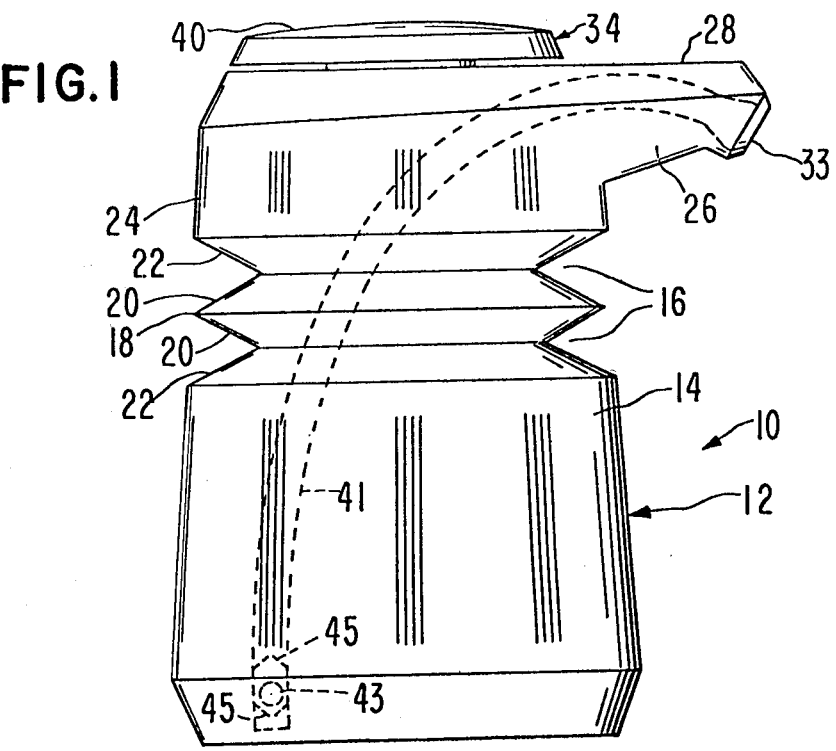
FIG.1
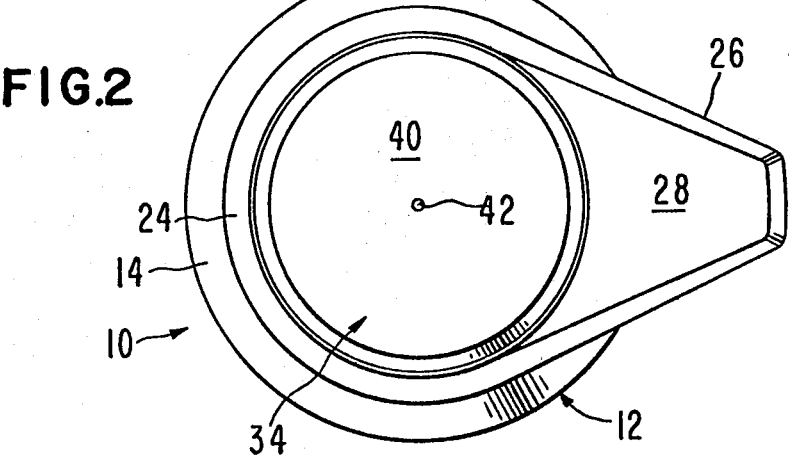
FIG.2
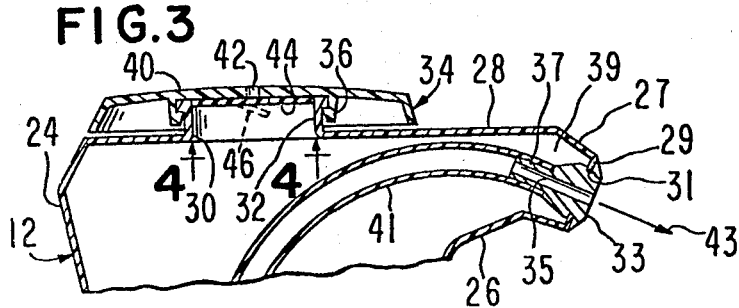
FIG.3
FIG.4

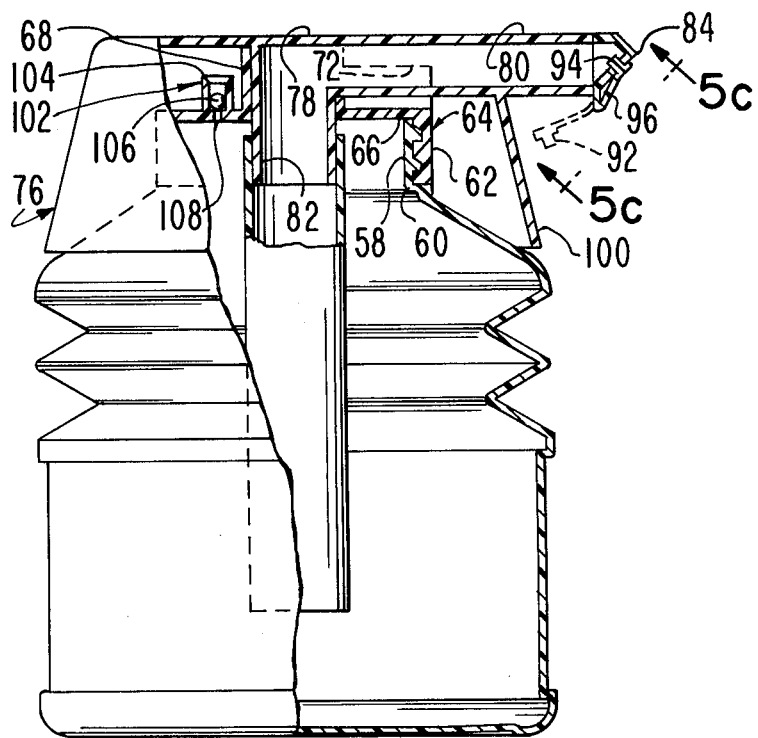
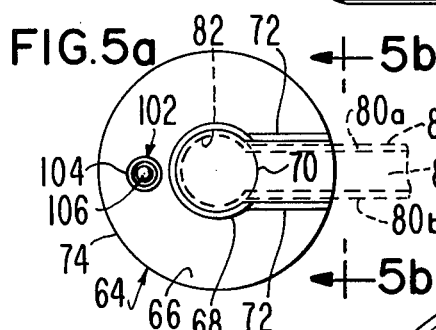
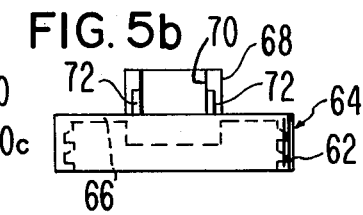
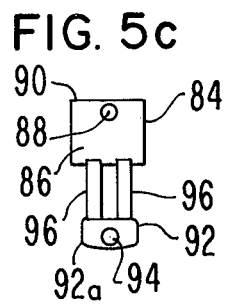
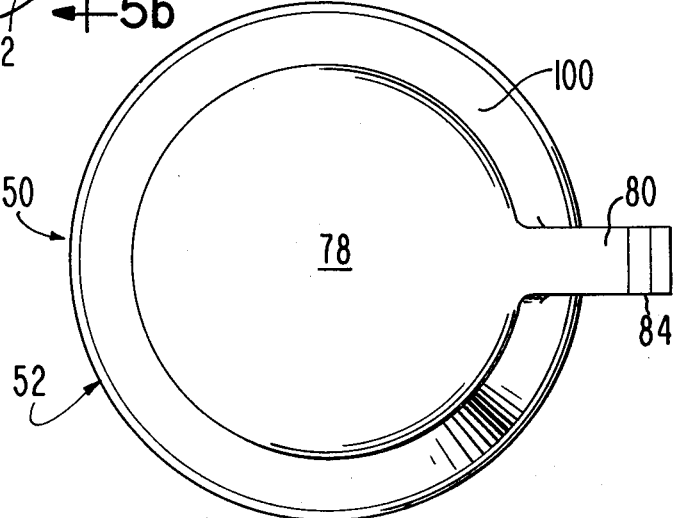

DISPENSER WITH SIDE SPOUT FOR FLOWABLE MATERIAL

This is a continuation-in-part of application Ser. No. 928,581, filed July 27, 1978 now abandoned, the latter application being a continuation-in-part of application Ser. No. 852,139, filed Nov. 16, 1977, now U.S. Pat. No. 4,146,154, application Ser. No. 852,139 being a continuation of application Ser. No. 683,628, filed May 5, 1976 now abandoned.

This invention relates to improvements in dispensing of flowable materials by a hand pumping operation and, more particularly, to an improved materials dispenser having a collapsible container provided with a side spout for delivery of flowable materials therefrom.

BACKGROUND OF THE INVENTION

Liquid dispensers having collapsible containers have been known in the past. Containers of this type have been disclosed in the following group of U.S. Pat. Nos. 2,544,658; 2,752,069; 2,246,807; 3,618,829 and 3,705,668. U.S. Pat. No. 4,146,154, from the application of which the present application derives, and Japanese patent No. 42-13658 also disclose a liquid dispenser having a collapsible container.

Of the foregoing group of patents, only U.S. Pat. No. 3,618,829 teaches the use of a corrugated sidewall for a liquid dispenser which collapses upon the application of a downward force thereto. The other patents of the above group have yieldable side or bottom walls which shift relative to other parts to decrease the volume of a container.

U.S. Pat. No. 3,618,829 teaches a cap threaded on the upper end of a corrugated container and the cap has an inclined nozzle secured to its upper surface and extending upwardly and outwardly therefrom. The base of the nozzle thus projects directly upwardly from the top of the cap and leaves substantially no room on such upper surface to apply downward pressure with the hand or fingers on the dispenser to collapse its sidewall. To apply the downward force effectively, the upper part of the dispenser must first be grasped and then the downward force can be exerted. Only one or two fingers, at best, can be used and these must engage at least part of the base of the nozzle, making it uncomfortable to exert the force on the cap since the upper surface of the cap is substantially covered by the base of the inclined nozzle. One or two fingers will not adequately provide the necessary force because the force will be mainly on one side of the cap to cause the dispenser to tip or collapse non-uniformly, thereby impeding or disrupting the proper flow of liquid therefrom.

U.S. Pat. No. 4,146,154 discloses the use of a funnel-shaped dispenser member attached to the upper end of a container having a corrugated sidewall, and a hole is provided in the lower end of the funnel-shaped member for communication with a downwardly extending tube in the container. When a downward force is exerted on the top rim of the funnel member, liquid is caused to spurt upwardly and onto the palm of the hand or other object covering the open top of the funnel member so that the liquid engages the hand or object for a specific use, such as for applying liquid soap to the hand. This type of dispenser is essentially limited to coating the hand or other object in the path of the upwardly directed liquid. The Japanese patent is pertinent only in that it has a corrugated sidewall.

Other patents which relate to fluid dispensing include U.S. Pat. Nos. 2,275,051; 3,124,275 and 2,824,672. However, these patents disclose only collapsible tops for containers rather than collapsible containers.

All of the forgoing patents fail to teach or suggest a liquid dispenser which delivers liquid quickly and easily to a side outlet of a collapsible container with a simple hand action applied to an unobstructed top surface of the container. A need has, therefore, arisen for an improved container capable of accomplishing this purpose so that the container can be used for liquid having viscosities in a relatively wide range, yet the dispenser is simple and rugged in construction, has a minimum of parts, and can be quickly and easily assembled.

SUMMARY OF THE INVENTION

This invention satisfies the aforesaid need by providing a dispenser for flowable materials, such as liquids, powders and the like, wherein the dispenser has a container with a corrugated sidewall and a side delivery spout which projects laterally from the upper part of the container. The dispenser also has an unobstructed upper surface which is substantially free of any structure and of sufficiently large area so that a manual force, such as applied by the palm, fingers or any other part of the hand, can be readily exerted on the top of the dispenser without interference from other structure on the dispenser. This will cause the container to collapse uniformly and to deliver material, either of high viscosity or of low viscosity liquid or a powder, to the side delivery spout from whence the material is directed outwardly of the spout and onto the hand or other object in the path of the material. For purposes of illustration only, the dispenser will hereafter be considered a liquid dispenser although the dispenser can be used to dispense a flowable solid material.

In one embodiment, the spout is tubular and the outer end of the spout has an opening in which is mounted a tubular plug defining the liquid outlet for the container. A tube is connected to the inner end of the plug and extends laterally through the spout away from the plug and then downwardly to a location near the bottom of the container for delivery of liquid to the outlet from the container when a downward force is exerted on the top of the container to collapse it. In another embodiment, the spout extends inwardly of the container along the lower surface of the top of the container and terminates centrally thereof so that a tube connected to the inner end of the spout extends downwardly to the location near the bottom of the container for delivering liquid to the spout when the container is collapsed.

In the first embodiment, the dispenser is closed at the top to prevent a substantially unobstructed upper surface. This is preferably achieved with a cap mounted on the upper part of the container in closing relationship to a top opening therethrough, the top opening permitting a liquid to be directed into the container for filling it. If the cap and opening are not used, liquid can be put into the container through the opening of the spout. If a cap is used, the top of the cap defines the unobstructed upper surface of the dispenser. The dispenser, with or without the cap, may be provided with an air hole therethrough or through the cap when a relatively viscous liquid is to be dispensed. If a hole is used, a valve may be used to control the flow of air through the hole. The valve operates to close the hole when a downward force is exerted on the dispenser to collapse the container. The valve opens the hole when the container expands after the force is removed.

In the second embodiment, the dispenser has a top member which has upper and lower surfaces and which has the spout connected to, integral with and extending partially along the lower surface. The top member is removably connected, such as by the threads, to the open top of the container and a skirt may be used to surround and thereby conceal the connection of the top member to the container. The container typically has a cylindrical shape but can have other shapes, such as a spherical shape, if desired.

The parts of the dispenser are preferably formed from plastic to minimize production and assembly costs and to allow molding of the parts. The dispenser can be thrown away after a single use or can be refilled and used a number of times.

The primary object of this invention is to provide an improved liquid dispenser having a side delivery spout wherein the dispenser has an upper, relatively large surface substantially free of any structure which might interfere with the hand or other object which engages the surface, whereby a downward force can quickly and easily applied to the dispenser by the hand or other object so that the dispenser will collapse uniformly and deliver a liquid to the outer end of the spout and outwardly therefrom.

Another object of this invention is to provide a liquid dispenser of the type described wherein the dispenser is simple and rugged in construction, is inexpensive to produce and assemble, and is reliable for use in dispensing liquids having viscosities in a wide range of values.

Other objects of this invention will become apparent as the following specification progresses, reference being had to the accompanying drawing for an illustration of the invention.

IN THE DRAWING

FIG. 1 is a side elevational view of one embodiment of the liquid dispenser of the present invention;

FIG. 2 is a top plan view of the dispenser;

FIG. 3 is a fragmentary, vertical section through the upper part of the dispenser;

FIG. 4 is a bottom plan view of the valve member of the dispenser, looking in the direction of lines 4—4 of FIG. 3;

FIG. 5 is a view similar to FIG. 1 but showing another embodiment of the dispenser, parts being broken away and in section to show details of construction;

FIG. 5a is a top plan view of a connector part for connecting the top of the dispenser of FIG. 5 to the container thereof;

FIG. 5b is a view of the connector part of FIG. 5a looking in the direction of line 5b—5b of FIG. 5a;

FIG. 5c is an elevational view of the fluid outlet end of the dispenser of FIG. 5, looking in the direction of line 5c—5c of FIG. 5;

FIG. 6 is a top plan view of the dispenser of FIG. 5;

Figure 7:
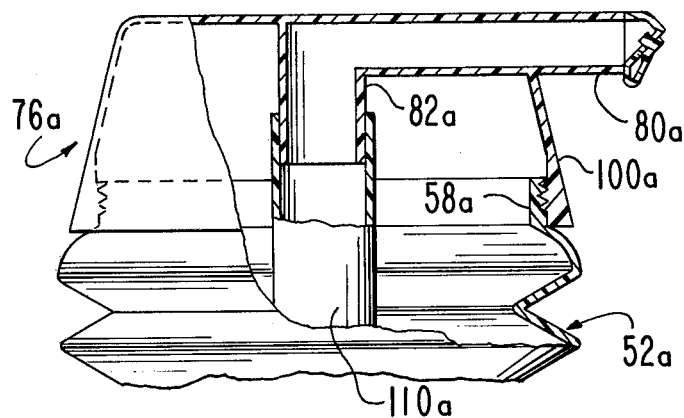
FIG. 7 is a fragmentary, cross-sectional view of a third embodiment of the dispenser.

A first embodiment of the liquid dispenser of the present invention is broadly denoted by the numeral 10 and includes a container 12 having a corrugated sidewall 14 which is capable of collapsing when a downward force is exerted on the upper part thereof. To allow for collasping, sidewall 14 is provided with one or more corrugations so that the side wall is transversely saw-toothed, rounded or the like. For purposes of illustration, side wall 14 has two annular V-shaped grooves 16 formed therein to present a single corrugation 18 having beveled annular surfaces 20 which converge with respective beveled annular surfaces 22 at the inner extremities of grooves 16. In essence, therefore, surfaces 20 and 22 are, for purposes of illustration, conical and are generally annular in configuration; however, they can be of other configurations, if desired. Thus, when sidewall 14 is in its equilibrium or expanded position of FIG. 1, surfaces 20 and 22 are relatively far apart; however, when a downward force is applied to the upper part of the container, side wall 14 yields at the junctions between surfaces 20 and 22 and these surfaces move toward each other in accordion fashion. When this occurs, the interior of the container is decreased in volume.

Container 12 has an upper annular part 24 provided with a sidewall segment from which a tubular extension or side delivery spout 26 projects laterally beyond the side wall of the container, the side spout being integral with upper part 24. Container 12 has a flat top surface 28 (FIG. 3) provided with an opening 30 therethrough. A neck 32 integral with the container extends upwardly from opening 30 to present an open top through which liquid can pass when the container is to be filled.

The outer end of side spout 26 has an inclined outer part 27 (FIG. 3) provided with an annular end flange 29 surrounding an opening 31. A tubular plug 33 having an annular groove near the outer end thereof is press-fitted, threaded or sealed into opening 31 so that flange 20 is received within the groove of the plug as shown in FIG. 3 to releasably hold the plug in place. The plug has a short axial length, a bore 35 therethrough, and a tubular inner part 37 which is disposed within the interior 39 of side spout 26 when the plug is mounted as shown in FIG. 3. The outer end of the spout can have a closure, if desired. The closure, plug and tube can be of a one-piece construction or can be separate pieces. If one-piece, the closure can be of a twist-off, snap-off or nip-off type or any other type.

A flexible tube 41 is press-fitted at one end thereof on the inner part 37 of plug 33 and extends through a major part of side spout 26 and then downwardly into the major part of container 12 to a location at which its lower, open end is near the bottom of the container as shown in dashed lines in FIG. 1. Tube 41 and plug 33 provide the passage for a liquid which is forced out of the container when a downward force is exerted on the container to reduce the volume thereof. The liquid will be discharged from the outlet end of plug 33 along a path denoted by arrow 43 (FIG. 3) which extends downwardly and outwardly from side spout 26. However, the liquid could be discharged in a horizontal direction extending laterally from side spout 26 or could be discharged vertically downwardly, depending upon the way in which the outlet of the plug is oriented relative to the horizontal.

A cap 34 is either threadedly mounted or press-fitted to neck 32 to close the open top thereof. For purposes of illustration, cap 34 is shown in FIG. 3 as being press-fitted on the neck, the cap having an annular skirt 36 provided with a shoulder for hooking beneath an annular flange on the upper end of neck 32. Either or both of neck 32 and skirt 36 are yieldable to allow a releasable connection therebetween.

Dispenser 10 has its upper surface completely free of obstruction. To this end, cap 34 has an upper, unobstructed surface 40 which, although it is slightly convex as shown, is transverse to the vertical and is adapted to be engaged by the hand or several fingers of the hand or by another object to apply a downward force to the container to collapse the same. For purposes of illustration, surface 40 is slightly convex to accommodate the curvature of the fingers when they are slightly flexed; however, it could be flat, if desired. If it is convex, surface 40 has a curvature which is sufficiently small so that it can be considered substantially flat. The important criterion is that surface 40 and surface 28, be substantially free of obstructions or impeding structure and be sufficiently large in area to allow the palm, fingers or other part of the hand to be lowered onto and to engage the surface and to press straight downwardly without interference, such interference occurring, for instance, when the palm engages in irregular surface having an upwardly projecting part or requiring the fingers to straddle an obstruction on such upper surface to exert a downward force. Thus, a downward force can be quickly applied to the top of the dispenser without tipping it or causing discomfort to the hand or fingers.

Cap 34 may have an air hole 42 therethrough. For purposes of illustration, the hole is shown at the center of the cap. If a hole is used, a valve may be associated with the hole to control the air flow therethrough. Any type of valve may be used for this purpose. For purposes of illustration, a valve 44 is provided on the inner surface of cap 34 and has a flapper tab 46 which is formed by merely stamping member 44 so that it is cut along a curved line 48 (FIG. 4). This tab 46 directly underlies hole 42 and provides a valve for closing hole 42 when a downward force is exerted on cap 34. Tab 46 opens as shown in dashed lines in FIG. 3 when the downward force is removed and the container is allowed to expand. In addition, the cap itself can act as a valve by being shiftably mounted on the container for up and down movement through a small distance to make the container airtight when a downward force is exerted on the cap to collapse the container and to allow air to enter the container upon removal of the force.

Hole 42 is typically provided in cap 34 only in cases where viscous liquids, such as ketchup, mustard and the like are to be dispensed from container 12. For dispensing less viscous liquids, such as after-shave lotion, liquid soap and the like, hole 42 is ordinarily not required because sufficient air will be drawn into the container through tube 44 after a downward force exerted on the cap is removed.

In use, container 12 is filled with the liquid to be dispensed to a certain level. This is accomplished when cap 34 is removed and the liquid is poured through the open top of neck 32. Then, the cap is replaced to cover the container and the dispenser is now ready for use.

To dispense liquid from the container, a downward force by the hand or other object is exerted on upper surface 40 of cap 34 to collapse the container and reduce its internal volume, causing liquid to be forced upwardly through tube 41 and out of the outlet end of plug 33. Since surface 40 is unimpeded and free of any structure and is sufficiently large in area, it can be engaged by the palm of the hand, by the fingers or by any other part of the hand to apply the downward force to the container. The side spout projects laterally from upper part 24 of container 12 and is thereby spaced from surface 40 so as not to interfere with the hand or other object which applied the force. Moreover, the liquid outlet opening of the dispenser is below the horizontal plane in which the force is exerted on the cap; therefore, the hand or other object which applies the force does not interfere with the dispensing of the liquid.

When the downward force is removed from cap 34, air can enter the container through hole 42 to cause the container to expand again. The air passes through hole 42 because the reduced air pressure in the upper part 24 of container 12 causes tab 46 to open, allowing air to pass into the container. In the case where the hole 32 is not used, such as for liquids with low viscosity, the air returns by way of tube 41 then the downward force is removed from cap 34. This air therefore allows the container to expand and return to its equilibrium position.

All parts of dispenser 10 are typically of plastic material. Container 12, cap 34 and plug 33 are preferably molded in any suitable manner, the container being typically blow molded to provide a high quality container at minimum cost. Valve member 44 can be formed from sheet plastic material which is stamped to form tab 46.

In assembling the container, tube 41 is first press-fitted onto inner part 37 of plug 33, than the tube is inserted into opening 31 at the outer end of extension 26 and finally the plug 33 is press-fitted into position as shown in FIG. 3. In this position, tube 41 extends downwardly so that the open inner end of the tube is near the bottom of the container.

The container and cap could be made so that they are integral with each other with the only opening in the dispenser being the opening in the outer end of the spout. This opening would be used to fill the container. In such a case, the dispenser product would have a generally unimpeded upper surface free of any structure such as described above with respect to upper surface 40 of cap 34. Thus, the palm, fingers or other part of the hand can easily and without interference engage the top of the dispenser to quickly apply a downward force thereto to collapse the container thereof.

While valve 44 is shown to open and close opening 42, any other suitable type of valve can be used for this purpose, if desired. Moreover, the location of the valve and its corresponding hole can be at other locations then that shown in FIG. 3. In addition, a ball valve or similar check valve can be placed in tube 41, typically at the lower end thereof, to keep the tube filled with liquid after the tube has been primed. FIG. 1 shows a ball 43 used as a check valve, the ball being restricted in its movement by perforate upper and lower stops 45. Using such a valve, liquid can flow upwardly in the tube during collapse of the container but the liquid is substantially prevented from flowing downwardly in the tube during expansion of the container.

FIG. 5 shows another embodiment of the dispenser, such embodiment being denoted by the numeral 50 and including a container 52 provided with a side wall 54 having one or more corrugations 56 therein to permit partial collapse of the container when a downward force is applied thereto.

Container 52 has a tubular neck 58 extending upwardly from the open top 60 of the container, the neck being externally threaded to receive the internally threaded flange 62 of a one-piece connector part 64 having a top wall 66 and a tubular member 68 extending upwardly from wall 66. Member 68 is not completely cylindrical. It is cut away to present a side opening 70 (FIGS. 5a and 5b), and a pair of side strips 72 extend laterally from opening 70 to the outer periphery 74 of top wall 66 (FIG. 5b).

Connector part 64 is adapted to be removably connected to a top 76 having a flat top wall 78 and a side spout 80 extending laterally from top wall 78 and forming a continuation thereof. To this end, member 68 is slidably mounted on a tube 82 on top wall 78 to connect part 64 with top 76. In its operative position, member 68 engages the under side of top wall 78 and side spout 80 is received in opening 70, the side spout having a generally square cross-section and the position of the side spout is shown in dashed lines in FIG. 5a, the side spout having a pair of spaced sides 80a and 80b and a bottom wall 80c, the sides and bottom wall being integral with top wall 78. Also, tube 82 is integral with sides 80a and 80b and with bottom wall 80c.

Spout 80 communicates with tube 82 and has an outer nozzle-like element 84 which has an end wall 86 provided with an opening 88 near the upper marginal edge 90 of wall 86. A closure 92 having a projection 94 is pivotally carried by straps 96 on member 84 near the lower margin 98 thereof. Straps 96 are preferably integral with element 84 and are of the length to permit projection 94 to be removably and frictionally received within opening 88. FIG. 5 shows, in dashed lines, the position of closure 92 when projection 94 is out of the hole 88. In this condition, the outer marginal edge 92a (FIG. 5c) of closure 92 can frictionally engage the adjacent surface of an annular skirt 100 on top 76 so that closure 92 can be releasably retained in a retracted position beneath spout 80. Skirt 100 is integral with top wall 78 and surrounds part 64 and neck 58 to conceal the same and to provide an aesthetic appearance for the container. A tube 110 is press-fitted on tube 82 and extends downwardly therefrom and terminates near the bottom 52a of the container. Bottom 52a has an upper surface which is slightly concave as shown in FIG. 5. The concave nature of this surface becomes more pronounced when the container sidewall is collapsed. This feature is for causing the liquid to be concentrated in the center of the surface when the container is almost empty so that tube 110 can contact the liquid and form a passage for upward travel of the liquid. In the alternative, tube 110 can be curved to collect liquid near the outer periphery of the bottom if the upper surface of the bottom is slightly convex.

Connecting part 64 can have a valve 102 if one is desired or necessary. The valve includes a tubular body 104 having a ball valve 106 caged therein over an air hole 108 in top wall 66 of member 64. The valve operates to permit air from container 52 to escape through the open top of body 104 and under skirt 100 when a downward pressure is exerted on the top flat surface of top wall 78 yet the valve is closed when the container expands thereafter.

The top flat surface of top wall 78 provides an unobstructed surface free of upwardly projecting parts and sufficiently large in area to allow the palm, fingers or other part of the hand to be lowered onto and to engage the surface and to press straight downwardly without interference, such interference occurring, for instance, when the palm engages an irregular surface having an upwardly projecting part or requiring the fingers to straddle an obstruction on such upper surface to exert a downward force. The top flat surface of top wall 78 is generally parallel with the flat bottom surface of container 52.

In use, a flowable material, such as a liquid, is placed in the container when the top of the container is open, the upper level of the fluid being above the bottom of tube 110. Then top 76 is placed on the container and the closure is moved away from hole 88. Then, a downward force can be exerted by the palm or fingers on the flat upper surface 78 to cause liquid to be dispensed through the side spout and out of opening 88. Since opening 88 is near the upper margin of the end wall 86 of member 84, there will be substantially no dripping of liquid from opening 88 after liquid has been dispensed therefrom. Dripping would occur if the hole were closer to lower margin 98 of end wall 86.

An improvement of the dispenser 50 is shown in FIG. 7 and denoted by the numeral 50a. Dispenser 50a has a container 52a which is provided with a neck 58a of greater diameter than neck 58 of dispenser 50. Neck 58a is externally threaded to receive internal threads on skirt 100a on a top 76a. This feature eliminates the need for part 64 of dispenser 50 and allows the upper end of tube 110a to be frictionally received on tube 82a communicating with spout 80a. All other aspects of the dispenser 50a, including its flat top surface, are the same as those of dispenser 50.

Figure 8:
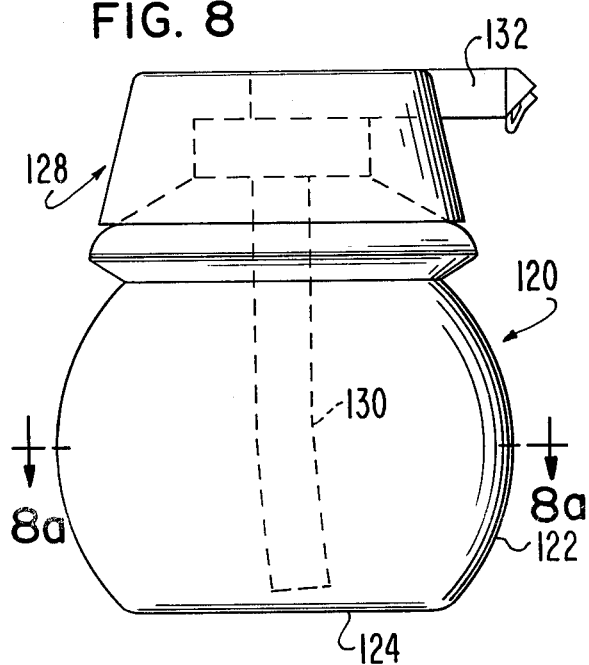
FIG. 8 is a side elevational view of a fourth embodiment of the dispenser.
Figure 8A:
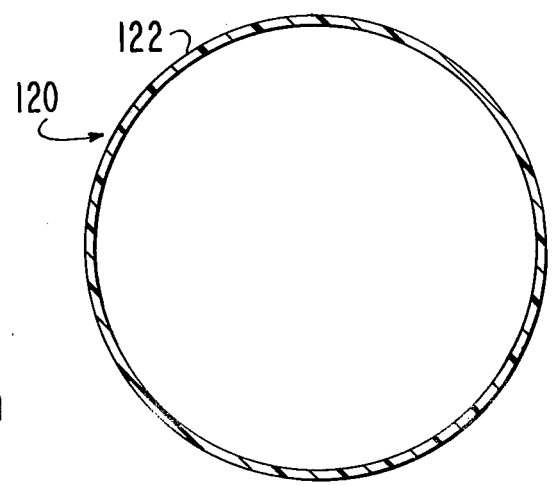
FIG. 8a is a cross-sectional view taken along line 8a—8a of FIG. 8.

FIGS. 8 and 8a show another embodiment of the dispenser of this invention, the embodiment being denoted by the numeral 120. Dispenser 120 has a spherically shaped, plastic body 122 provided with a flat bottom surface 124 and a corrugation 126 near the upper end thereof to allow collapsing of the container. Above the corrugation, the body has a neck and is connected to a top 128 which is constructed substantially in the same manner as top 76 of dispenser 50. A tube 130 is coupled to the side spout 132 of top 128 in the manner described above with respect to dispenser 50. The advantage of the container 122 is that the container sidewall collapses or deflects in the vicinity of its largest diameter as well as at corrugation 126 and/or at the most flexible part of the sidewall, including the top part and bottom part to get additional reduction in volume of the container.

Figure 9:
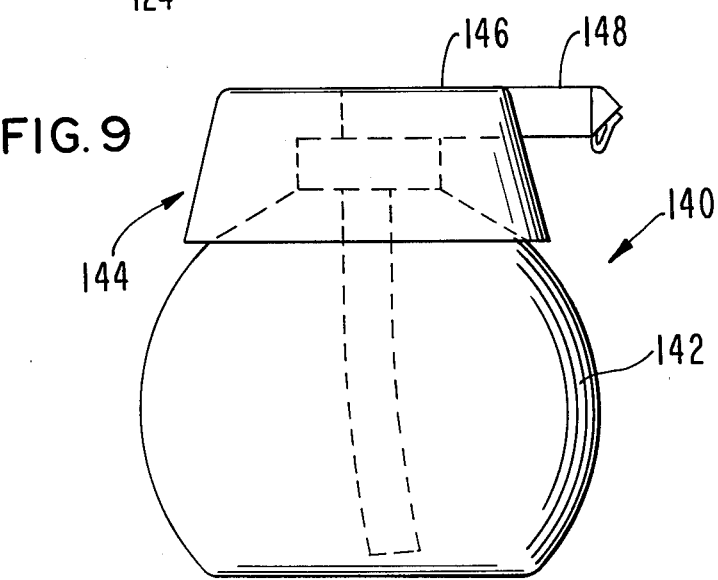
FIG. 9 is a view similar to FIG. 8 but showing another embodiment of the dispenser.

FIG. 9 illustrates a dispenser 140 which is essentially the same in construction as dispenser 120 except that dispenser 140 has a container 142 without a corrugation in its sidewall, such as corrugation 126 of dispenser 120. All other features of dispenser 140 are the same as those of dispenser 120. Dispenser 140 is of a material capable of being flexed, such as a moldable plastic material, and the container sidewall can flex at its most flexible part which is determined by wall thickness, configuration, type of material and other factors to decrease the internal volume of the container. The top 144 of container 140 has a flat upper surface 146 in which side spout 148 extends laterally as in the case of side spout 132 of dispenser 120.

I claim:
1. A material dispenser comprising: a container having a generally vertical axis and adapted to be supported on a support surface, said container having a side wall having a corrugation that is collapsible in a direction along said axis when the container is on said support surface to permit reduction of the volume of the container, said container adapted to receive a flowable material to be dispensed, the container having a spout extending laterally therefrom, the spout having an opening at the outer end thereof, the container having an upper surface extending transversely of said axis, said upper surface being substantially flat throughout substantially its entire area to permit a downward force to be exerted on said upper surface to collapse side wall when the container is on said support surface, at least a portion of the upper extremity of the spout being substantially coextensive with said upper surface; and a tube placing the spout in fluid communication with the interior of the container below the material level therein, whereby the material in the container will be dispensed therefrom when a downward force is exerted on said upper surface to collapse said container to reduce the volume thereof.

2. A dispenser as set forth in claim 1, wherein the container has an upper part, said spout being integral with the upper part.

3. A dispenser as set forth in claim 1, wherein said container has a generally cylindrical sidewall provided with a corrugation to permit collapse of the sidewall.

4. A dispenser as set forth in claim 1, wherein said container has a spherically shaped sidewall formed from a yieldable material, said sidewall being collapsible at the portion thereof of greatest diameter.

5. A dispenser as set forth in claim 4, wherein the sidewall has a corrugation near the upper end of the container.

6. A dispenser as set forth in claim 1, wherein the container has a top opening, and including a top for removably closing the top opening, the upper surface of the top being the upper surface of the container, said spout being carried by the top.

7. A dispenser as set forth in claim 6, wherein said spout has a substantially flat upper surface flush with with the upper surface of said top.

8. A dispenser as set forth in claim 6, wherein the container has a neck, and means on the top for connecting the top to said neck.

9. A dispenser as set forth in claim 8, wherein said connecting means includes a connector part threadably connectable to the neck of the container.

10. A dispenser as set forth in claim 8, wherein the neck is threaded, said connecting means including a skirt secured to the top and threadably connectable to the neck.

11. A dispenser as set forth in claim 1, wherein the outer end of the spout has an inclined extension, the spout opening being at the outer end and the upper margin of the extension, whereby the liquid will be dispensed from the spout opening along an inclined path.

12. A dispenser as set forth in claim 1, wherein said tube has a check valve coupled therewith near the lower end thereof to permit upward travel of liquid in the tube and to substantially prevent downward movement of the liquid in the tube.

13. A liquid dispenser comprising: a container having a generally vertical axis, an upper part, and a collapsible side wall thereon below said upper part, said container adapted to be supported on a support surface and to receive a liquid to be dispensed, the sidewall of the container being collapsible in a direction along said axis when the container is on said support surface to permit reduction of the volume of the container, there being a spout on the container, said spout being provided with an outer end and an inner end and an opening at the outer end thereof, the container having an upper surface trasverse to the vertical, said upper surface being substantially flat throughout substantially its entire area to permit a downward force to be exerted by the hand on said upper surface to collapse said side wall when the container is on said support surface, the spout being secured to and extending laterally from the side of the upper part of the container, at least a portion of the upper extremity of the spout being substantially coextensive with said upper surface; and a tube placing the spout in fluid communication with the interior of the container below the liquid level therein, the upper end of the tube being coupled to the inner end of the spout, whereby liquid in the container will be dispensed therefrom when a downward force is exerted on said upper surface to collapse said portion to reduce the volume of the container.

14. A liquid dispenser as set forth in claim 13, wherein the spout and the container are integral with each other.

15. A liquid dispenser as set forth in claim 13, wherein the container portion has at least one corrugation.

16. A liquid dispenser as set forth in claim 13, wherein the container has a top opening and a top for removably closing the opening, the spout being carried by the top, and a nozzle element at the outer end of the spout.

17. A liquid dispenser as set forth in claim 16, wherein the nozzle element has an end wall and a liquid discharge opening through the end wall, and a closure carried by the nozzle element for closing the discharge opening.

18. A liquid dispenser as set forth in claim 17, wherein the discharge opening is adjacent to the upper extremity of the end wall, said closure having a portion integral with the nozzle element.

19. A liquid dispenser as set forth in claim 16, wherein the container has a removable top, said spout being integral with the top.

20. A liquid dispenser as set forth in claim 19, wherein the top has an upper wall, a lower surface portion of the upper wall defining a boundary of the spout.

21. A material dispenser comprising: a container having a generally vertical axis and adapted to be supported on a support surface, said container having a side wall collapsible in a direction along said axis when the container is on the support surface to permit reduction of the volume of the container, said container adapted to receive a flowable material to be dispensed, the container having a top opening, a top having an upper wall removably closing the top opening, and a spout integral with the upper wall and extending laterally therefrom with the lower surface of the upper wall forming a boundary of a part of the spout, the spout having an opening at the outer end thereof, the container having an upper surface extending transversely of said axis, said surface being substantially flat and free of upwardly projecting structure throughout substantially its entire area to permit a downward force to be exerted on said upper surface to collapse said side wall when the container is on said support surface; and a tube placing the spout in fluid communication with the interior of the container below the material level therein, whereby the material in the container will be dispensed therefrom when a downward force is exerted on said upper surface to collapse said container to reduce the volume thereof.

22. A dispenser as set forth in claim 21, wherein the upper surface of the upper wall of the top defines said upper surface of the container, said spout having an upper surface coextensive with the upper surface of said upper wall.

23. A material dispenser comprising: a container having a generally vertical axis and adapted to be supported on a support surface, said container having a corrugated side wall collapsible in a direction along said axis when the container is on said support surface to permit reduction of the volume of the container, said container adapted to receive a flowable material to be dispensed, the container having a top opening, a top removably closing the top opening, and a spout integral with the top, one part of the spout extending laterally from the top and a second part of the spout extending along the lower surface of the top to a central location thereon, the spout having an opening at the outer end thereof, the container having an upper surface extending transversely of said axis, said surface being substantially flat and free of upwardly projecting structure throughout substantially its entire area to permit a downward force to be exerted by the hand on said upper surface when the container is on said support surface; a tube for placing the spout in fluid communication with the interior of the container below the material level therein; and means for connecting one end of the tube to the inner end of the spout whereby the material in the container will be dispensed therefrom when a downward force is exerted on said upper surface to collapse said container to reduce the volume thereof.

24. A dispenser as set forth in claim 23, wherein said connecting means includes a second tube extending downwardly from said lower surface.

25. A liquid dispenser comprising: a container having an upper part and a collapsible portion thereon below said upper part to permit reduction of the volume of the container, said container having a top wall provided with a fluid passage therethrough and adapted to receive a liquid to be dispensed, there being a cap for removably covering the passage, the cap having a hole therethrough the container having a spout provided with an outer end and an inner end, the spout having an opening at the outer end thereof, the container having an upper surface transverse to the vertical, top of the cap defining at least a part of said upper surface, the spout being secured to and extending laterally from the side of the upper part of the container at a location no higher than said upper surface, said upper surface being substantially free of any obstruction; a valve formed from a member of resilient sheet material with the member being severed along a line to define a flapper tab, the member being on the lower surface of the cap with the tap in vertical alignment with the hole therethrough; a tube placing the opening of the spout in fluid communication with the interior of the container below the liquid level therein, said tube having an upper part within the spout and a lower part within the container, the upper end of the tube being coupled to the outer end of the spout in fluid communication with said opening, whereby liquid in the container will be dispensed therefrom when a downward force is exerted by the hand on said upper surface to collapse said portion to reduce the volume of the container.

26. A liquid dispenser comprising: a container having an upper part and a collapsible portion thereon below said upper part to permit reduction of the volume of the container, said container having a top wall provided with a fluid passage therethrough and adapted to receive a liquid to be dispensed, there being a cap for removably covering the passage, the cap having a hole therethrough, the cap being shiftably mounted for up and down movement on the top wall, said cap being movable downwardly to close said passage when a downward force is exerted on the cap to collapse the container and being movable upwardly to open said passage when the force is removed from the cap, the container having a spout provided with an outer end and an inner end, the spout having an opening at the outer end thereof, the container having an upper surface transverse to the vertical, the top of the cap defining at least a part of said upper surface, the spout being secured to and extending laterally from the side of the upper part of the container at a location no higher than said upper surface, said upper surface being substantially free of any obstruction; a tube placing the opening of the spout in fluid communication with the interior of the container below the liquid level therein, said tube having an upper part within the spout and a lower part within the container, the upper end of the tube being coupled to the outer end of the spout in fluid communication with said opening, whereby liquid in the container will be dispensed therefrom when a downward force is exerted by the hand on said upper surface to collapse said portion to reduce the volume of the container.

27. A liquid dispenser comprising: a container having an upper part and a collapsible side wall portion thereon below said upper part to permit reduction of the volume of the container when a downward force is applied to the side wall portion when the container is supported on a support surface, said container adapted to receive a liquid to be dispensed, the container having a top wall provided with a fluid passage therethrough, there being a cap removably covering the passage, the container having a hollow extension provided with an outer end, the extension having an opening at the outer end thereof, the container having an upper surface transverse to the vertical, the extension being secured to and extending laterally from the side of the upper part of the container substantially coextensive with said upper surface; a tube placing the outer end opening of the spout in fluid communication with the interior of the container below the liquid level therein, said tube having an upper part within the extension and a lower part within the container, the upper end of the tube being coupled to the outer end of the extension in fluid communication with said opening, whereby liquid in the container will be dispensed therefrom when a downward force is exerted by the hand on said upper surface to collapse said portion to reduce the volume of the container.

28. A liquid dispenser as set forth in claim 27, wherein the cap has a hole therethrough.

29. A liquid dispenser as set forth in claim 28, wherein is included a valve formed from a member of resilient sheet material with the member being severed along a line to define a flapper tab, the member being on the lower surface of the cap with the tab in vertical alignment with the hole therethrough.

30. A liquid dispenser as set forth in claim 27, wherein is included a tubular plug coupled with the outer end of the spout and extending into the opening thereof, the upper end of the tube being coupled to the inner end of the plug.

* * * * *